Oct. 28, 1958 E. NITSCHE 2,858,239

METHOD FOR PRODUCING SELENIUM RECTIFIERS

Filed March 13, 1956

Inventor:

Erich Nitsche

United States Patent Office 2,858,239

Patented Oct. 28, 1958

2,858,239

METHOD FOR PRODUCING SELENIUM RECTIFIERS

Erich Nitsche, Berlin-Siemensstadt, Germany, assignor to Siemens-Schuckertwerke Aktiengesellschaft, Berlin, Germany, a joint-stock company of Germany Application March 13, 1956, Serial No. 571,306

29 Claims. (Cl. 117—200)

Figure 1:
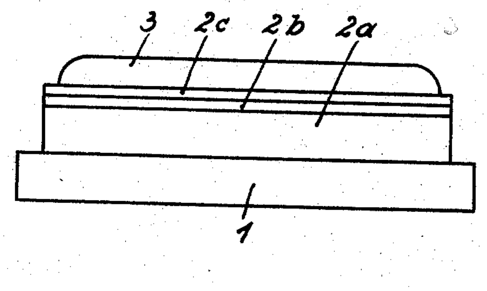

The invention relates to the manufacture of selenium rectifiers.

Rectifiers are required to have the smallest possible resistance in the forward direction and the highest possible resistance in the blocking direction. These two requirements are contradictory to some extent. It is therefore desirable to provide a manufacturing method which, depending upon the particular operating requirements for which the rectifier is intended, permits the favoring of either the forward conductance properties or the blocking properties, without, however, neglecting the properties in the respective opposite directions.

The forward properties of a rectifier can be identified by reference to the so-called differential resistance as expressed by $$R_{\text{diff}}=\frac{dU}{dI}$$

wherein U is the voltage applied to the rectifier and I the current intensity. The value of this term is determined for a forward voltage above the so-called threshold voltage. The blocking properties of a rectifier are defined by the so-called peak inverse voltage, i. e. the voltage value in the blocking direction in which a pre-determined, but permissible, current occurs in the blocking direction. It is generally desirable to produce rectifiers capable of withstanding a high inverse voltage.

To obtain pre-determined electric properties of the rectifier, the method according to the invention utilizes a semiconductor of multi-layer design. In reference to a method for producing dry rectifiers having a multi-layer semiconductor of selenium, the essence of the present invention resides in that the selenium of all layers is given an addition of halogen to increase conductance, and that the selenium in a preferably lesser number of layers adjacent to or nearer the barrier layer of the finished rectifier is given a second addition to increase the blocking resistance of the rectifier. The quantity of the second addition is such that the ultimate conductance in each of the layers adjacent the barrier is smaller than the conductance produced in the same layer by the halogen content only. The "ultimate conductance of the layer" is understood to mean the conductance which the layer exhibits after the conventional thermal or electrical forming treatment of the rectifier unit.

Suitable as halogen additions for the purpose of the invention are elemental halogens, selenium-halogen compounds or mixtures thereof. It is also possible to use different halogenous additions in different layers of the same rectifier. The second addition, to increase the blocking resistance, is preferably thallium. However, aside from thallium, other substances such as indium, gallium and sulfur or an alloy or compound thereof can be used for the same purpose.

It is known as such to add thallium to the cover electrode of a rectifier for increasing the blocking ability. In rectifiers of this type, the thallium diffuses out of the cover electrode during the subsequent fabricating operation and also during operation of the rectifier into the semi-conductor layer in a non-controllable manner. It is, therefore, impossible with such rectifiers to use the thallium concentration in the semi-conductor layer in an accurate dosage.

The present invention is based upon the recognition that the barrier-promoting effect of a substance, for instance of the thallium, is not dependent upon a high absolute value of concentration within the selenium but is rather determined in a definitely given manner by the presence of a halogen addition. It has been found that an increase in blocking effect of the rectifier, by virtue of the second addition, takes place if the quantity of the second addition relative to the halogen addition in the same layer is made so large that this layer has reduced electric conductivity as compared with the conductivity which the same layer would have by virtue of the halogen content alone. Consequently, relative reduction in conductance in the particular layer is essential. Absolute low conductivity of the particular layer is not essential. When the concentration of the second addition is too small, then in cooperation with the halogen addition an increase in conductance of the layer will result and simultaneously the barrier-promoting effect of the second addition is eliminated. Consequently, the occurrence of reduction in conductance within the layer by means of the second addition represents a criterion on the basis of which, for a given halogen content of the layer, the necessary minimum concentration of the second, barrier-promoting substance can be determined. The present invention, therefore, makes it possible to determine the relative concentration of the halogen and the thallium in the barrier-adjacent layer with respect to each other in such a manner that the resistance of this layer remains low and that, nevertheless, a rectifier of relatively high blocking ability is obtained.

If a high blocking voltage, that is peak inverse voltage, is of importance, then, in accordance with another feature of the invention, the quantities of the additions, which are to be contained in those layers which are to have additions of both kinds, can be so determined that the ultimate conductance of the individual layers is graduated, as follows: Each layer located closer to the barrier layer in the finished rectifier has a smaller conductivity than a layer more remote from the barrier layer. On the other hand, also in accordance with the invention, a rectifier of low forward resistance can be produced by employing, in the layers containing adidtions of both types, a halogen addition of greater quantity than in the layers more distant from the barrier layer. By so doing the addition of the second addition substance reduces the ultimate conductance of the barrier-adjacent layer only down to approximately the conductance of the more remote layer or layers.

In order to exemplify the various varieties of the novel method discussed hereinabove, some embodiments of the invention will be described with reference to Figs. 1 and 2. For the sake of clarity the vertical dimensions are shown on a larger scale in the drawings than the horizontal dimensions.

For producing a selenium rectifier having a semiconductor layer composed of three strata having a conductivity which decreases as the distance of the stratum from the blocking layer decreases, one may proceed as follows:

A supporting plate 1 serves as a basis for applying the layers, such supporting plate being a nickel-plated steel sheet or an aluminum sheet. First the supporting plate is treated by a special process with selenium in such manner that the layer of nickel near its surface is converted into nickel selenide. For this purpose, pulverized selenium may be uniformly dusted upon the plate. The formation of the selenide is then caused by heating the plate to temperatures between 180° C. and 350° C., for a period of five to ten minutes. By this treatment the formation of a blocking layer between the supporting plate and the semi-conductor proper, to be applied afterwards, is avoided.

The individual layers of the semi-conductor may be applied by vaporization in vacuum. For applying three layers of a semi-conductive material, three receptacles containing the materials of the individual layers are provided within the vaporization space. The receptacle may be heated. First, the content of one of the receptacles is vaporized and forms the lowermost layer 2*a*. This material is selenium having an addition of about .02% by weight of chlorine. The following percentages refer to the weight of the component materials. The material in the second receptacle which forms the central layer 2*b* is selenium having an addition of .02% chlorine and .05% thallium. The material in the third receptacle forming the following layer 2*c*, which is the layer closest to the blocking layer, is selenium containing an addition of .02% chlorine and .10% thallium.

After the supporting plate has been first heated to a temperature of between 100° C. and 140° C., the contents of the three receptacles is vaporized one after the other in the aforestated sequence.

The initial quantities of the materials to be vaporized are so chosen that the layer 2*a* will have a thickness of about $30\times10^{-4}$ centimeters and the layer 2*b* and the layer 2*c* will have a thickness of $10\times10^{-4}$ centimeters. Then the supporting plate with the superimposed layers of semi-conductive materials is removed from the vacuum container and is placed in an oven in which it is heated for a period of about one hour to a temperature of 110° C. After this heat treatment the cover electrode 3 of the rectifier element is applied, for instance by spraying. The cover electrode 3 may consist in a known manner of an alloy of cadmium, tin and bismuth and preferably is free from thallium. The step of applying the cover electrode, however, may be carried out directly upon removal from the vaporization container, that is to say prior to the heat treatment at 110° C. The rectifier element provided with the completed layers is then heated to a temperature of 218° C. for a period of about ten minutes. By this treatment, the semi-conductor body is given a crystalline structure resulting in the highest conductivity and, at the same time, the formation of the blocking layer is initiated. Thereafter, an electrical formation is performed in the conventional manner by applying voltages in blocking direction for the purpose of increasing the blocking resistance.

For producing a rectifier having a high blocking resistance and a particularly low passage resistance one may proceed as follows in composing the semi-conductor body shown in Fig. 2 of two layers:

On a supporting plate 11 subjected to the same preparatory treatment as explained above, a layer 12*a* of selenium is applied by vaporization, such layer containing about .02% chlorine. The second layer 12*b* contains about .04% chlorine and about .10% thallium. As a result of the choice of these percentages, the secondary addition of the thallium will reduce the conductivity of the upper layer 12*b* substantially to the degree of the conductivity of the lower layer 12*a*, such thallium serving to increase the blocking resistance. A thickness of the layer 12*a* of about $40\times10^{-4}$ centimeters has proved satisfactory, whereas the layer 12*b* should preferably have a thickness of about $10\times10^{-4}$ centimeters. After the layers 12*a* and 12*b* have been applied and treated as above described, the cover electrode 13 is formed in the same manner as explained heretofore.

A further reduction of the forward resistance can be obtained, according to a further feature of the invention, by employing, in one or more of the halogen containing layers more remote from the barrier layer, a secondary addition substance which, by virtue of its functional coaction with the halogen, increases the conductance of the selenium in these layers beyond the value resulting from the halogen alone. Suitable as secondary addition substances, which together with the halogen produce a considerable conductance increase of the selenium, are mainly tellurium and iron. However, other metals, such as antimony, bismuth, tellurium, tin, copper, cadmium, lead, or alloys or compounds of the mentioned metals are suitable. Non-metallic substances, for example arsenic or sulfur, have the same effect when used in a comparatively low concentration. It has further been found that as the secondary addition substance for increasing conductivity, the same substances can be used in low concentration which in the other layers are added in greater concentration for the purpose of increasing the blocking resistance of the rectifier. Thus thallium in slight concentration may be used. It has been mentioned above that thallium, too, in the presence of halogen, may have a conductance-increasing effect if used in a correspondingly slight concentration. It may also be of advantage to add the halogen addition and the conductance-increasing second addition to the selenium directly in form of a compound which contains both substances. Particularly suitable for this purpose are ferric or ferrous chloride ($FeCl_2$ or $FeCl_3$).

Figure 2:
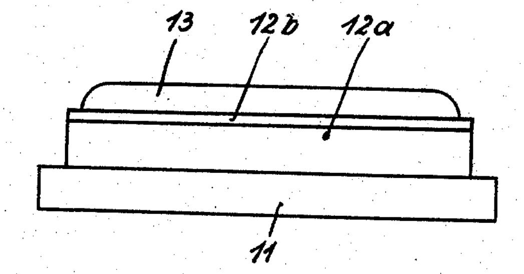

This modification of the novel method of manufacture may be illustrated by the following example:

According to this modification, where the semi-conductor body consists of two layers, as illustrated in Fig. 2, the layer 12*a* comprises selenium having a content of about .02% chlorine and about .005% tellurium. The layer 12*b* consists of selenium having a content of about .04% chlorine and of about .10% thallium. The small content of tellurium in the layer 12*a*, in cooperation with the content of chlorine, has the effect of increasing the eventual conductivity of this layer in the finished rectifier above the degree of conductivity which such layer would have in the absence of the secondary addition of tellurium, that is to say if the layer had an addition of chlorine only. The addition of thallium in the layer 12*b* increases the blocking resistance of the rectifier in its finished condition and, at the same time, reduces the conductivity of the layer 12*b* below the degree of conductivity the layer would have in the absence of the thallium. Preferably, the layer 12*a* has a thickness of about $40\times10^{-4}$ centimeters, and the layer 12*b* has preferably a thickness of about $10\times10^{-4}$ centimeters.

For the tellurium in the layer 12*a* the same percentage of thallium may be substituted. Thallium in such a small quantity has likewise the effect of increasing the eventual conductivity of the layer.

Instead of adding halogen and metal separately to the material of layer 12*a* a chemical compound of both elements may be added to the selenium, for instance about .03 to .04% ferric chloride ($FeCl_3$). Preferably, the individual layers in these examples are applied to the supporting plate 11 by vaporization.

It is a further object of the present invention to provide an improved method of manufacturing rectifiers that have a differential resistance in the passage direction of medium degree and will sustain a high blocking voltage. According to the present invention, a method for the attainment of this object is provided in which a first set of consecutive layers of semi-conductive material, which are adjacent to the eventual blocking layer in the finished rectifier, is produced from selenium to which a material for increasing the blocking resistance is added, whereas a second set of layers remote from the eventual blocking layer of the rectifier is produced from selenium to which one or more halogens are added to increase the conductivity. This method may be carried out in such a manner that the set of layers remote from the eventual blocking layer has a content of halogen which drops with diminishing distance from the blocking layer. In this way a rectifier is provided which has as low a path resistance as possible and yet is suited for a use involving a very high blocking voltage. This method, however, can be also carried out in such a way that between the layer or the layers of a semi-conductive material comprising selenium and additional matter added for increasing the blocking resistance and the layer or layers of selenium provided with an addition of halogen only, further layers may be interposed which are provided with additions of both kinds, that is to say with material added to increase the blocking resistance and with material added to increase the conductivity beyond the degree predetermined by the halogen alone, said additions of both kinds being so chosen that the conductivity of the interposed further semi-conductive layers is varied, the layers closer to the eventual blocking layer of the rectifier having a reduced conductivity compared with the layers farther remote therefrom.

A specific embodiment of the novel method for producing rectifiers having a medium differential resistance and a high blocking capacity may comprise one in which two semi-conductive layers are provided, as shown in Fig. 2, the layer 12*a* having a content of about .02% chlorine and the layer 12*b* a content of about .04% thallium.

It is another object of the present invention to provide rectifiers having a low differential resistance, with respect to their passage properties, and nevertheless are capable of use with a very high blocking voltage acting in the blocking direction. For this purpose a method of producing selenium rectifiers composed of a plurality of semi-conductive layers is used, in which the selenium constituting the layer or layers adjacent to the eventual blocking layer of the completed rectifier is provided with an addition for increasing the blocking resistance, and in which the selenium constituting the following layer or layers is provided with a primary addition formed by a halogen and with a secondary addition formed by one or more metals or non-metallic materials, said additions being in such quantities as to cooperate to increase the eventual conductivity of the last-mentioned layers above the magnitude attainable by the addition of a halogen alone.

Within the scope of this aspect of the invention the secondary additional materials which are not in the nature of halogens may be introduced in the form of chemical compounds. The halogen may be introduced into the selenium of the various layers in form of mixtures of halogen or compounds of halogen or mixtures of such compounds. The primary halogen addition and the secondary addition of a material that is not in the nature of a halogen may be introduced directly in form of a chemical compound incorporating both additions at the same time. The addition that is not in the nature of halogen may directly have the property of being adapted to increase the blocking resistance as a result of the processing of the rectifier.

A specific embodiment of this species of the novel method of producing rectifiers having a very low differential resistance but a high blocking capacity may comprise one in which there are two layers of semi-conductive materials as shown in Fig. 2, the layer 12*a* consisting of selenium having a primary addition of about .02% chlorine and a secondary addition of about .005% tellurium, the layer 12*b* consisting of selenium having an addition of about .04% thallium only. The layers are applied and processed in the same manner as described hereinabove.

According to a theory which has been often advanced to explain the function of a rectifier, the boundary between the semi-conductive layer and an intermediary layer is instrumental in the rectifying effect, such intermediary layer being disposed between the semi-conductive layer and the cover electrode and consisting of a product of reaction between the selenium and a metal contained in the cover electrode and, more particularly, in the alloy thereof. Such an intermediary layer can be formed, for instance, from a reaction of cadmium contained in the cover electrode and the selenium of the semi-conductive layer and, in this event, may consist of cadmium selenide. This reaction between the metal of the cover electrode and the semi-conductive material of the rectifier system producing the intermediary layer may take place, for instance, during the formation process to which the rectifying system is subjected. In this event, the material constituting the intermediary layer is generated in the rectifier. Alternatively, however, the material constituting the intermediary layer may be produced in a preparatory step of the process as a product of reaction and may be applied to the semi-conductive layer in form of an intermediary layer disposed below the cover electrode.

It is another object of the present invention to provide an improved method of manufacturing a selenium rectifier in which the most favorable possible conditions are created for formation of such rectifier structure. On the one hand, an efficient intermediary layer is generated as a product of reaction between the semi-conductive material and a metal contained in the cover electrode and, on the other hand, an additional material is rendered available for such intermediary layer to increase the blocking resistance, such additional material being directly present and, preferably, substantially only at the point where an increase of the blocking resistance is attainable, that is to say at the point where the blocking layer is to be formed.

In carrying out the novel method, the semi-conductive layer which is farthest from the supporting electrode is given a thickness substantially of the order of the intermediary layer which, in the course of the formation of the rectifier, is formed as a product of reaction between the metal of the cover electrode and the selenium, such remote layer being provided with an admixture of a material suitable to increase the blocking resistance, for instance of thallium, the quantity of such added material being in the order of from $.5\times10^{-6}$ to $5\times10^{-6}$ grams per square centimeter of the surface of the semi-conductive layer. Investigations have revealed that the intermediary layer instrumental in the blocking effect of a selenium rectifier has a thickness in the order of $10^{-5}$ centimeters. The aforementioned preparatory layer consisting of selenium and an additional material serving to increase the blocking resistance may be produced, according to the invention, by applying to the semi-conductor a coat of this material having a thickness of from $3\times10^{-4}$ to $5\times10^{-4}$ centimeters to thereby ensure that the rectifier will have an unobjectionable and effective blocking layer.

It is known per se to use a material, such as thallium, increasing the blocking resistance of the rectifier by either admixing such material to that of the cover electrode or by coating the semi-conductor with a special layer of such material. The above described novel method in which the semi-conductor is coated with a layer which prepares the formation of the intermediary reaction layer and consists of a mixture of the semi-conductive material and of a material adapted to increase the blocking resistance, results in a surprising economy compared with the known method in that materials for increasing the blocking resistance are saved. This is of a very material importance for the ageing stability of the rectifier. Where the material promoting the formation of the blocking layer was applied to the semi-conductive layer in form of a coat of thallium, it had been proposed to give this coat a thickness of from $10^{-4}$ to $10^{-3}$ centimeters. Consequently, a quantity of $1.2\times10^{-6}$ grams of thallium was required per square centimeter of the surface of the semi-conductor. Where the material promoting the formation of the blocking layer was added to the metal of the cover electrode, it had been proposed to add less than 1%, more particularly .05 to .1% thallium to such metal.

Taking a selenium rectifier of the conventional design having a cover electrode of a thickness of $10^{-2}$ centimeters, this prior method would require a quantity of thallium of from $6\times10^{-6}$ to $120\times10^{-6}$ grams per square centimeter of the surface of the semi-conductor, the specific weight of thallium amounting to 11.84 grams per cubic centimeter. The method of the present invention requires but a substantially smaller quantity of material promoting the formation of the blocking layer, to wit a quantity of $.5\times10^{-6}$ to $5\times10^{-6}$ grams per square centimeter of the semi-conductor surface. Experiments have shown that these minute quantities of additional material will result in a rectifier for high blocking voltages in the order of about 40 volts, such rectifiers having an ageing stability which far exceeds that of the selenium rectifiers manufactured with the prior methods.

This justifies the conclusion that, upon completion of the rectifier, after it has been subjected to the required processing steps, such as a heat treatment and/or an electrical treatment for forming the blocking layer, no free material, such as thallium, will be present that has not been consumed in building up the blocking layer.

The preparatory coat adapted to form the intermediary reaction layer may be applied to the semi-conductive layers of the rectifier by any suitable process, for instance by vaporization. This applies particularly to a method in which the other layers closer to the supporting electrode are likewise applied by vaporization. In this event, the preparatory coat may be applied by a vaporization method following directly the step of applying the other layers of the semi-conductor. As already stated, the preparatory coat promoting the formation of the intermediary reaction layer consists of a semi-conductive material and of a material for increasing the blocking resistance. It is within the purview of the present invention, therefore, to proceed in such a manner in applying the preparatory coat by vaporization that both materials are present in a common receptacle in form of a mixture and are vaporized from this receptacle, the vapors being then deposited to form the coat. It has been found that in such vaporization process it is difficult to always ensure that together with the selenium the required quantity of the blocking resistance-promoting material will be deposited on the semi-conductor applied to the supporting electrode of the rectifier system.

It is another object of the invention to modify the depositing process so as to overcome this difficulty and to ensure that in this depositing process the material increasing the blocking resistance will be safely conveyed from the vaporization receptacle to the surface of the semi-conductor. According to the invention, this object is attained by providing the material in the vaporization receptable, that is to say the mixture of selenium and of the blocking resistance-promoting material, with an addition of one or more halogens.

Experience has shown, however, that under certain circumstances only an undesirably small quantity of the blocking resistance-promoting material will be deposited. perhaps this may be explained by the fact that the halogen serving as conveying agent vaporizes more easily than the blocking resistance-promoting material.

According to another feature of the present invention, this difficulty may be overcome by increasing the content of halogen in the material to be vaporized beyond the quantity required to form a chemical compound according to the stoichiometrical conditions between the added metal and the halogen.

As already mentioned, thallium is a suitable additional material for increasing the blocking resistance. Suitable halogens are bromine and iodine. Therefore, I prefer for the purpose of the depositing process, particularly for depositing the last layer adjacent to the eventual blocking layer, to use, in the vaporizing apparatus, a selenium having appropriate quantities of thallium and iodine admixed thereto.

For carrying out this novel depositing process in which a halogen is used as an agent conveying the material for increasing the blocking resistance, the receptacle for the material to be vaporized may be charged, for instance, with selenium to which about .04% thallium and about .025% iodine are admixed. With this choice of the quantities there will be one atom of iodine for any atom of thallium. For the above stated reasons it may be preferable, however, to take twice the quantity of the iodine added to the selenium, that is to say .05% iodine for the same quantity of thallium so that there will be about two atoms of iodine for each atom of thallium.

The present invention, however, is not restricted to such a method of manufacturing a rectifier in which the starting materials for applying the preparatory coat are accommodated in a common vaporization apparatus, since it is perfectly feasible in the depositing process to vaporize the material for increasing the blocking resistance separately from the semi-conductive material, separate receptacles being provided for such materials, the vapors being conducted together to the surface to be coated for deposition thereon. This modification of the depositing process may be controlled in such a manner that, for the purpose of building up the preparatory coat, alternately extremely thin coats of semi-conductive material and coats of the blocking resistance-promoting material are deposited. This will ensure that directly at the zone where the blocking layer is to be formed a special coat of semi-conductive material will be present containing a sufficient quantity of semi-conductive material for building up the intermediary reaction layer and, at the same time, an appropriate quantity of blocking resistance-promoting material will be present at the boundary between the layer to be formed by the reaction and the other semi-conductive layer or layers.

While the invention has been described in connection with a number of different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and such as fall within the scope of the invention or the limits of the appended claims.

What I claim is:

1. A method of making a dry rectifier comprising forming a sandwich comprising a base plate, a first layer of selenium and a halogen element, the first layer being disposed toward the base plate, and at least one additional layer of selenium, a halogen element and a second material which increases the blocking resistance, the second material being selected from the group consisting of thallium, indium, gallium and sulfur and being added in an amount such that the ultimate conductivity of the additional layer in the finished rectifier is smaller than the ultimate conductivity of the same layer obtainable by the halogen element alone, the sandwich further comprising a cover electrode applied to the additional layer, the cover electrode being substantially free of said second material, and heating the semiconductor body so formed to produce a crystalline structure and to initiate the formation of a blocking barrier layer adjacent the cover electrode.

2. A method of making a dry rectifier, having a barrier layer comprising forming a sandwich comprising a base plate, a first layer of selenium and a halogen element, the first layer being disposed toward the base plate, and at least one additional layer formed of selenium, a halogen element and a second material which increases the blocking resistance, the second material being selected from the group consisting of thallium, indium, gallium and sulfur and being added in an amount such that the ultimate conductivity of the additional layer in the finished rectifier is smaller than the ultimate conductivity of the same layer obtainable by the halogen element alone, the proportions of halogen element and of second material in the various layers being such that any layer closer to the barrier layer of the completed rectifier has a smaller conductivity than a layer more distant from the barrier layer, the sandwich further comprising a cover electrode applied to the additional layer, the cover electrode being substantially free of said second material, and heating the semiconductor body so formed to produce a crystalline structure and to initiate the formation of a blocking barrier layer adjacent the cover electrode.

3. A method of making a dry rectifier having a barrier layer, comprising forming a sandwich comprising a base plate, a first layer of selenium and a halogen element, the first layer being disposed toward the base plate, and at least one additional layer of selenium, a halogen element and a second material which increases the blocking resistance, the halogen element being in higher proportion in the additional layer than in the first layer, the second material being selected from the group consisting of thallium, indium, gallium and sulfur and being added in an amount such that the ultimate conductivity of the additional layer in the finished rectifier is smaller than the ultimate conductivity of the same layer determined by the halogen element alone and such that it reduces the ultimate conductivity only down to substantially the conductivity of the said first layer, the sandwich further comprising a cover electrode applied to the additional layer, the cover electrode being substantially free of said second material, and heating the semiconductor body so formed to produce a crystalline structure and to initiate the formation of a blocking barrier layer adjacent the cover electrode.

4. A method of making a dry rectifier having a barrier layer, comprising forming a sandwich comprising a base plate, a first layer of selenium and a halogen, the first layer being disposed toward the base plate, a second layer of selenium and a second material which increases the blocking resistance, the proportion of second material in the second layer being such that the second layer has a smaller conductivity than the first layer, in the completed rectifier, the second material being a substance selected from the group consisting of thallium, indium, gallium, and sulfur, the sandwich further comprising a cover electrode applied to the second layer, the cover electrode being substantially free of said second material and heating the semiconductor body so formed to produce a crystalline structure and to initiate the formation of a blocking barrier layer adjacent the cover electrode.

5. A method of making a dry rectifier comprising forming a sandwich comprising a base plate, a first layer of selenium and a halogen, the first layer being disposed toward the base plate, and at least one additional layer of selenium, a halogen and a second material which increases the blocking resistance, the second material being selected from the group consisting of thallium, indium, gallium and sulfur and being added in an amount such that the ultimate conductivity of the additional layer in the finished rectifier is smaller than the ultimate conductivity of the same layer determined by the halogen alone, the sandwich further comprising a cover electrode applied to the additional layer, the cover electrode being substantially free of said second material, and heating the semiconductor body so formed to produce a crystalline structure and to initiate the formation of a blocking barrier layer adjacent the cover electrode, one of the layers remote from the barrier layer having a further addition substance which increases the conductivity of the selenium over that determined by the halogen.

6. The method defined in claim 5 in which the further addition is a metal halide.

7. A method of making a dry rectifier comprising forming a sandwich comprising a base plate, a first layer of selenium and chlorine adjacent the base plate, a second layer of selenium, chlorine, and thallium, a third layer of selenium, chlorine, and an amount of thallium greater than that in the second layer, and further comprising a cover electrode applied to the third layer, the cover electrode being substantially free of thallium, and heating the semiconductor body so formed to produce a crystalline structure and to initiate the formation of a blocking layer adjacent to the cover electrode, the chlorine serving to increase the ultimate conductance, the thallium being added to increase the blocking resistance and being present in said second and third layers in an amount such that the ultimate conductance of each of these layers is smaller than the ultimate conductance of the same layer determined by the halogen content alone.

8. The method of claim 7 in which the first layer has a chlorine content of about .02% by weight, the second layer has a chlorine content of about .02% chlorine and about .05% thallium, the third layer has a content of about .02% chlorine and 0.10% thallium.

9. A method of making a dry rectifier comprising forming a sandwich comprising a base plate, a first layer of selenium and chlorine adjacent the base plate, a second layer of selenium, chlorine, and thallium, and further comprising a cover electrode, substantially free of thallium, adjacent the second layer, the thallium being added to increase the blocking resistance and being present in said second layer in an amount such that the ultimate conductance of that layer is smaller than the ultimate conductance of the same layer determined by the halogen content alone, heating the semiconductor body so formed to produce a crystalline structure and to initiate the formation of a blocking layer.

10. The method of claim 9 in which the chlorine content of the first layer is about .02% chlorine, and the second layer contains about .04% chlorine and about 0.10% thallium, this relative thallium content serving to reduce the conductivity of the second layer substantially to the degree of conductivity of the first layer.

11. A method of making a dry rectifier comprising forming a sandwich comprising a base plate, and a first layer of selenium, chlorine, and tellurium adjacent the base plate, a second layer of selenium, chlorine and thallium, and further comprising a cover electrode applied to the second layer, the tellurium increasing the conductivity of the first layer above that which would result from the addition of chlorine alone, the chlorine increasing the ultimate conductance, the thallium being present in an amount to increase the resulting blocking resistance and to reduce the conductivity of the second layer below that which would result if the chlorine alone were added, and heating the semiconductor body so formed to produce a crystalline structure and to initiate the formation of a blocking layer adjacent the cover electrode.

12. The method of claim 11 in which the first layer contains about .02% chlorine and about .005% tellurium, and the second layer contains about .04% chlorine and about 0.10% thallium.

13. A method of making a dry rectifier comprising forming a sandwich comprising a base plate, and a first layer of selenium and a chloride of iron adjacent the first plate, a second layer of selenium, chlorine, and thallium, and further comprising a cover electrode adjacent the second layer, the chlorine increasing the ultimate conductance, the thallium being present in an amount to increase the resulting blocking resistance and to reduce the conductivity of the second layer below that which would result if the chlorine alone were added, and heating the semiconductor body so formed to produce a crystalline structure and to initiate the formation of a blocking layer adjacent the cover electrode.

14. A method of making a dry rectifier comprising forming a sandwich comprising a base plate, a first layer of selenium and chlorine adjacent the base plate, a second layer of selenium and thallium, the second layer being substantially halogen free, and a cover electrode on the second layer, heating the semiconductor body so formed to produce a crystalline structure and to initiate the formation of a blocking layer adjacent the cover electrode.

15. The process of claim 9 in which substantially no thallium is present in the first layer.

16. The process of claim 9 in which no more than about .005% thallium is present in the first layer, this including the case of zero thallium in the first layer.

17. A method of making a dry rectifier comprising forming a sandwich comprising a base plate, a first layer of selenium and chlorine adjacent the base plate, a second layer of selenium, a proportion of chlorine greater than in the first layer, and thallium, and further comprising a cover electrode substantially free of thallium on the second layer, the thallium being added to increase the blocking resistance and being present in said second layer in an amount such that the ultimate conductance of that layer is smaller than the ultimate conductance of the same layer determined by the halogen content alone, heating the semiconductor body so formed to produce a crystalline structure and to initiate the formation of a blocking layer.

18. A method of making a dry rectifier comprising forming a sandwich comprising a base plate, a first layer of selenium and chlorine adjacent the base plate, a second layer of selenium and thallium, the second layer being substantially halogen free, and a cover electrode on the second layer, substantially free of thallium, heating the semiconductor body so formed to produce a crystalline structure and to initiate the formation of a blocking layer adjacent the cover electrode.

19. A method of making a dry rectifier comprising forming a sandwich comprising a base plate, a first layer of selenium and chlorine adjacent the base plate, a second layer of selenium, chlorine, and a substance selected from the group consisting of thallium, indium, gallium, and sulfur, a third layer of selenium, chlorine, and an amount of said substance greater than that in the second layer, and further comprising a cover electrode applied to the third layer, the cover electrode being substantially free of said substance, and heating the semiconductor body so formed to produce a crystalline structure and to initiate the formation of a blocking layer adjacent to the cover electrode, the chlorine serving to increase the ultimate conductance, the said substance being added to increase the blocking resistance and being present in said second and third layers in an amount such that the ultimate conductance of each of these layers is smaller than the ultimate conductance of the same layer determined by the halogen content alone.

20. A method of making a dry rectifier comprising forming a sandwich comprising a base plate, a first layer of selenium and chlorine adjacent the base plate, a second layer of selenium and a substance selected from the group consisting of thallium, indium, gallium, and sulfur, the second layer being substantially halogen free, and a cover electrode on the second layer, heating the semiconductor body so formed to produce a crystalline structure and to initiate the formation of a blocking layer adjacent the cover electrode.

21. The method defined in claim 2, further characterized in that the layer adjacent to the barrier layer is deposited as a preparatory coating to form an intermediate reaction layer between the semiconductor and the cover-electrode metal, and that said coating having a thallium content of substance suitable for increasing the barrier resistance, of from 0.5 to $5\times10^{-6}$ gram per cm.$^2$ semiconductor surface, the thickness of the coating being 3 to $5\times10^{-4}$ cm., the coating being deposited upon one of said selenium layers.

22. The method defined in claim 21, characterized in that the preparatory coating is produced from alternating, extremely thin layers of semiconductor material and of the substance for increasing the barrier resistance respectively.

23. A method for manufacturing a dry rectifier having a barrier layer in the finished rectifier and having a multi-layer semiconductor of selenium, characterized in that a halogen element is added to the selenium of all layers, and that a second addition for increasing the blocking resistance of the rectifier is added to the selenium in a sequence of layers adjacent to the barrier layer of the finished rectifier, this sequence being less than all the layers, the second addition being added in such a quantity that the ultimate conductance of each of the barrier-adjacent layers in the finished rectifier is smaller than the conductance of the same layer determined by the halogen content alone, the layers than contain both additions being produced by vaporization, and wherein a metal is used as a further addition substance, the quantity of the halogen element addition in the evaporated starting material being made greater than is required for the formation of a stoichiometric compound between the metallic addition substance and the halogen.

24. The method defined in claim 7, the cover electrode containing cadmium, the layer adjacent to the barrier layer being deposited as a preparatory coating to form an intermediate reaction layer between the selenium and the cadmium, said coating having a thallium content of from 0.5 to $5\times10^{-6}$ grams per square centimeter of semiconductor selenium surface, the thickness of the coating being from about 3 to $5\times10^{-4}$ cm.

25. A method of making a dry rectifier comprising forming a sandwich comprising a base plate, a first layer of selenium and chlorine adjacent the base plate, a second layer of selenium, chlorine and thallium, a third layer of selenium, chlorine, and an amount of thallium greater than that in the second layer, and further comprising a cover electrode applied to the third layer, the cover electrode being substantially free of thallium, and heating the semiconductor body so formed to produce a crystalline structure and to initiate the formation of a blocking layer adjacent to the cover electrode, the chlorine serving to increase the ultimate conductance, the thallium being added to increase the blocking resistance and being present in said second and third layers in an amount such that the ultimate conductance of each of these layers is smaller than the ultimate conductance of the same layer determined by the halogen content alone, the cover electrode being an alloy of cadmium, tin and bismuth, the layer adjacent to the barrier layer being deposited as a preparatory coating to form an intermediate reaction layer between the selenium and the cadmium, said coating having a thallium content of from 0.5 to $5\times10^{-6}$ grams per square centimeter of semiconductor selenium surface, the thickness of the coating being from about 3 to $5\times10^{-4}$ cm.

26. A method of making a dry rectifier comprising forming a sandwich comprising a base plate, a first layer of selenium and a halogen, the first layer being disposed toward the base plate, and at least one additional layer of selenium, a halogen and a second material which increases the blocking resistance, the second material being selected from the group consisting of thallium, indium, gallium, and sulfur and being added in an amount such that the ultimate conductivity of the additional layer in the finished rectifier is smaller than the ultimate conductivity of the same layer determined by the halogen alone, the sandwich further comprising a cover electrode applied to the additional layer, the cover electrode being substantially free of said second material, and heating the semiconductor body so formed to produce a crystalline structure and to initiate the formation of a blocking barrier layer adjacent the cover electrode, one of the layers remote from the barrier layer having a further addition substance which increases the conductivity of the selenium over that determined by the halogen, said further addition substance being selected from the group consisting of tellurium, iron, arsenic and thallium, in a concentration such that the said increase in conductivity is obtained.

27. A method of making a dry rectifier comprising forming a sandwich comprising a base plate, a first layer of selenium and a halogen, the first layer being disposed toward the base plate, and at least one additional layer of selenium, a halogen and a second material which increases the blocking resistance, the second material being selected from the group consisting of thallium, indium, gallium and sulfur and being added in an amount such that the ultimate conductivity of the additional layer in the finished rectifier is smaller than the ultimate conductivity of the same layer determined by the halogen alone, the sandwich further comprising a cover electrode applied to the additional layer, the cover electrode being substantially free of said second material, and heating the semiconductor body so formed to produce a crystalline structure and to initiate the formation of a blocking barrier layer adjacent the cover electrode, one of the layers remote from the barrier layer having a further addition substance which increases the conductivity of the selenium over that determined by the halogen, said further addition substance being an iron chloride.

28. The method defined in claim 1, the second material being thallium.

29. The method defined in claim 1, the second material being thallium and the halogen element being iodine.

References Cited in the file of this patent

UNITED STATES PATENTS

| | | |
|---|---|---|
| 2,223,203 | Brunke | Nov. 26, 1940 |
| 2,279,746 | Thompson et al. | Apr. 14, 1942 |
| 2,307,474 | Thompson | Jan. 5, 1943 |
| 2,328,179 | Thompson et al. | Aug. 31, 1943 |
| 2,334,554 | Hewlett | Nov. 16, 1943 |
| 2,378,513 | Thompson et al. | June 19, 1945 |
| 2,453,763 | Smith | Nov. 16, 1948 |
| 2,476,042 | Hewlett | July 12, 1949 |
| 2,479,301 | Blackburn et al. | Aug. 16, 1949 |
| 2,496,432 | Blackburn | Feb. 7, 1950 |
| 2,496,692 | Blackburn | Feb. 7, 1950 |
| 2,736,672 | Klein | Feb. 28, 1956 |